United States Statutory Invention Registration [19]

[11] Reg. Number: H162

Sullivan, Jr. et al. [43] Published: Nov. 4, 1986

[54] SYSTEM AND METHOD FOR WIDE-AREA MINE CLEARANCE

[75] Inventors: John D. Sullivan, Jr., Edgewood; Charles N. Kingery, Aberdeen, both of Md.

[73] Assignee: The United States of America as represented by the Secretary of the Army, Washington, D.C.

[21] Appl. No.: 825,423

[22] Filed: Feb. 3, 1986

[51] Int. Cl.[4] ..... F42B 3/00

[52] U.S. Cl. ..... 102/403; 89/1.13; 102/363

*Primary Examiner*—Charles T. Jordan

*Attorney, Agent, or Firm*—Anthony T. Lane; Harold H. Card, Jr.; Michael C. Sachs

[57] ABSTRACT

A system and method for wide-area mine clearance employs a plurality of fuel-containing plastic containers disposed a horizontal distance apart which permits an overlap between adjacent aerosol clouds formed therefrom when explosive bursters are simultaneously detonated within each container. At least one detonation charge is exploded within one of the aerosol clouds following a predetermined time delay for detonating the line of overlapping clouds whereby a line of ground surface is exposed to a fuel-air explosion capable of detonating susceptible mines therein. The distance between adjacent containers and the height each container is suspended above the ground is related to the weight of the liquid fuel contained in each container. In the preferred embodiment, each plastic container is suspended from a tripod having a hook or other means for permitting attachment and detachment of a crane hook whereby the tripod may be positioned over uncleared ground from a location well within cleared ground. The detonation charge may also be suspended from a tripod at a distance from the nearest container which places it well within the cloud therefrom and at a height substantially equal to the height of the centers of the containers.

14 Claims, 4 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SYSTEM AND METHOD FOR WIDE-AREA MINE CLEARANCE

GOVERNMENTAL INTEREST

The invention described herein may be used, manufactured, or licensed by the Government for Governmental purposes, without payment to us of any royalties thereon or therefor.

BACKGROUND OF THE INVENTION

The present invention relates to explosives devices and, more particularly, to a system and a method for explosive devices in the clearance of minefields.

Minefield clearance falls generally into two categories: assault breach and wide-area clearance.

Assault breach, as its name implies, is principally concerned with a rapid clearance of a pathway through a defended minefield for the passage of vehicles and personnel. Frequently, this must be done under adverse combat conditions in which personnel safety is at risk. Thus, assault breach is not cost sensitive.

Wide-area clearance addresses full clearance of all mines emplaced in an area after active conflict is terminated. Conventional wide-area clearance techniques include visual detection, manual probing of the ground, and sweeping the ground with electronic detectors. These techniques are slow, incomplete, expensive, and dangerous to personnel. The present invention is particularly directed toward wide-area clearance.

One method for mine clearance includes detonating a charge in the vicinity of the mine to either explode the mine or otherwise render it inoperative. One technique used in assault breach employs a fuel-air explosive. A fuel-air explosive is one in which a liquid fuel such as, for example, propylene oxide, is explosively disseminated to form an aerosol cloud of fuel in air. The aerosol cloud may itself be detonated for a limited time after its formation. The fuel-air-explosive devices used in assault breach are unsatisfactory for wide-area clearance due to their expense, construction, and the presence of accessories which interfere with the desired functions in wide-area clearance, or which distribute debris which must be removed from the area. For example, conventional fuel-air explosive warheads are contained in a metal casing capable of producing metal shards that must be collected from the area after detonation. In addition, such warheads include safe and arm devices and cloud detonators that are not useful in wide-area clearance and thus must be removed before use.

It has been observed that it is possible to form several touching clouds of fuel-air explosive and that a detonation initiated in one of them is capable of propagating to the others of them to enlarge the total area affected by a single explosive event. This observation is applied to an invention next described.

OBJECTS AND SUMMARY OF THE INVENTION

Accordingly, it is an object of the invention to provide a system and method for wide-area mine clearance which overcomes the drawbacks of the presently known methods.

Another object of the invention is to provide means for replacing uncoordinated, individual action with a system capable of coordinating actions toward a single larger, mine-clearing explosion. The system saves time over individual actions, saves money and enhances personnel safety.

It is a further object of the invention to provide a system and method for wide-area mine clearance which employs a plurality of plastic containers suspended in a line spaced apart a distance providing overlapping aerosol clouds produced by explosive dissemination of a liquid fuel. At least one of the aerosol clouds is detonated a predetermined time after its formation and the explosion propagates along the length of the line to clear a substantial area of ground.

Briefly stated, the present invention provides a system and method for wide-area mine clearance employing a plurality of fuel containing plastic containers disposed a horizontal distance apart which permits an overlap between adjacent aerosol clouds formed therefrom when explosive bursters are simultaneously detonated within each container. At least one detonation charge is exploded within one of the aerosol clouds following a predetermined time delay for detonating the line of overlapping clouds, whereby a line of ground surface is exposed to a fuel-air explosion capable of detonating susceptible mines therein. The distance between adjacent containers and the height each container is suspended above the ground is related to the weight of the liquid fuel contained in each container. In a preferred embodiment, each plastic container is suspended from a tripod having a hook, or other means, for permitting attachment and detachment of a crane hook, whereby the tripod may be positioned over uncleared ground from a location well within cleared ground. The detonation charge may also be suspended from a tripod at a distance from the nearest container which places it well within the cloud therefrom and at a height substantially equal to the height of the centers of the containers.

According to an embodiment of the invention, there is provided a system for wide-area mine clearance comprising at least first and second fuel-air explosive units, each of the at least first and second fuel-air explosive units including a stand, a container effective for containing a fuel, means for suspending the container a first predetermined height above a surface, and means for bursting the container and dispersing the fuel to form at least first and second clouds of fuel droplets in air, respectively, each of the at least first and second clouds having a horizontal radius, the at least first and second fuel-air explosive units being positioned a first horizontal distance apart less than twice the horizontal radius whereby an explosion initiated in the first cloud from the first fuel-air explosive unit propagates to the second cloud from the second fuel-air explosive unit, at least one detonator unit, the at least one detonator unit containing a quantity of high explosive of a type effective for initiating a fuel-air explosion in one of the clouds, the at least one detonator unit including means for disposing the quantity of high explosive at a second horizontal distance of less than the horizontal radius from a center of the first cloud and at a second predetermined height above the surface, the second predetermined height being substantially equal to the first predetermined height, means for explosively bursting the containers in the at least first and second fuel-air explosive units simultaneously, whereby the at least first and second clouds are formed, and means for detonating the quantity of high explosive a predetermined time after explosively bursting the containers, whereby a fuel-air explosion is produced in the first and second clouds.

According to a feature of the invention, there is provided a method for wide-area mine clearance comprising positioning at least first and second fuel-air explosive units a first predetermined horizontal distance apart, suspending a first fuel container in the first fuel-air explosive unit and a second fuel container in the second fuel-air explosive unit a first predetermined height above a surface, explosively bursting the first and second fuel containers and dispersing the fuel to form first and second clouds of fuel droplets in air, respectively; each cloud having a horizontal radius, the first predetermined horizontal distance apart being less than twice the radius, whereby an explosion initiated in the first cloud from the first fuel-air explosive unit propagates to the second cloud from the second fuel-air explosive unit, positioning at least one detonator unit containing a quantity of high explosive of a type effective for initiating a fuel-air explosion in one of the first and second clouds at a second predetermined horizontal distance from the first fuel-air explosive unit and at the first predetermined height above the surface, the second horizontal distance being less than the horizontal radius, explosively bursting the first and second fuel containers simultaneously, whereby the first and second clouds are formed, and detonating the quantity of high explosive a predetermined time after explosively bursting the first and second fuel containers, whereby a fuel-air explosion is produced propagating from the first cloud to the second cloud.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
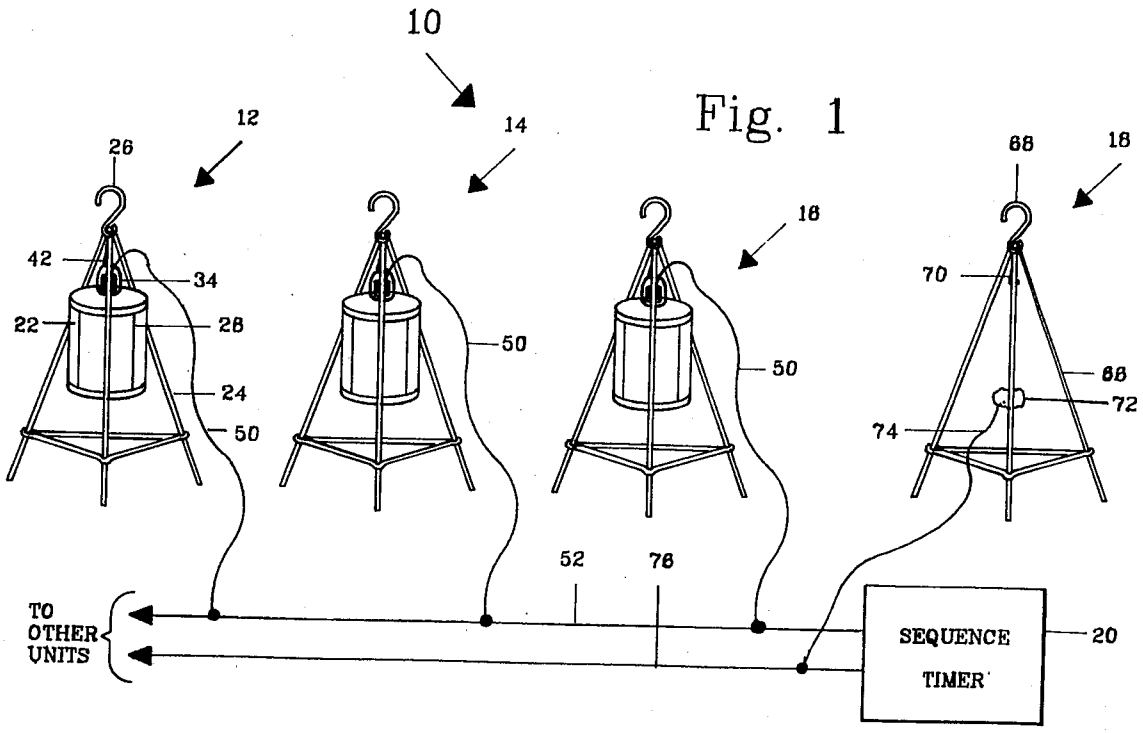
FIG. 1 is a simplified schematic view of a wide-area mine clearance system according to an embodiment of the invention.

Referring now to FIG. 1, there is shown, generally at 10 a wide-area mine clearing system according to an embodiment of the invention. In principle, wide-area mine clearing system 10 produces a connected plurality of explosive clouds disposed in a line which are then simultaneously detonated to clear a substantial area of mines susceptible to impulse detonation or disablement. Wide-area mine clearing system 10 includes a plurality of fuel-air explosive units 12, 14 and 16, a detonator unit 18 and a sequence timer 20.

Each fuel-air explosive unit such as, for example, fuel-air explosive unit 12, includes a container 22 suitable for containing a liquid such as, for example, propylene oxide, suspended a predetermined distance above the surface to be cleared on a stand 24. Stand 24 is preferably a tripod device, as shown, for the stability such devices offer. One commercially available type of device suitable for use as stand 24, with slight modification, includes a tripod device sold for holding funeral wreaths. Such a commercially available device is especially convenient since all three legs fold into a plane, thus facilitating transportation.

A hook 26 extends upward from stand 24 to permit engagement by a suitable lifting device such as, for example, a telescoping boom crane (not shown), thereby permitting fuel-air explosive unit 12 to be placed on uncleared ground by crane equipment positioned well inside cleared ground. Hook 26 may optionally be replaced by any other suitable device for enabling convenient engagement with a hook of a lifting device. For example, hook 26 may be replaced by a bar (not shown) welded, or otherwise affixed, across two of the legs of stand 24 near their upper junction which may be engaged and disengaged by a crane hook.

Container 22 is preferably a container molded of a suitable plastic such as, for example, polyethylene or polypropylene, in which a plurality of score lines 28 are formed to produce a controlled rupture pattern. Score lines 28 may be formed in the surface of container 22 in any convenient manner such as, for example, by a pattern in the mold used for forming container 22. For experimental purposes, at least, it is satisfactory to form score lines 28 using a hot iron such as, for example, a hot soldering iron. The score lines along which the hot soldering iron is drawn are substantially weakened but remain strong enough to contain the liquid therewithin until explosively opened by a burster charge.

Figure 2:
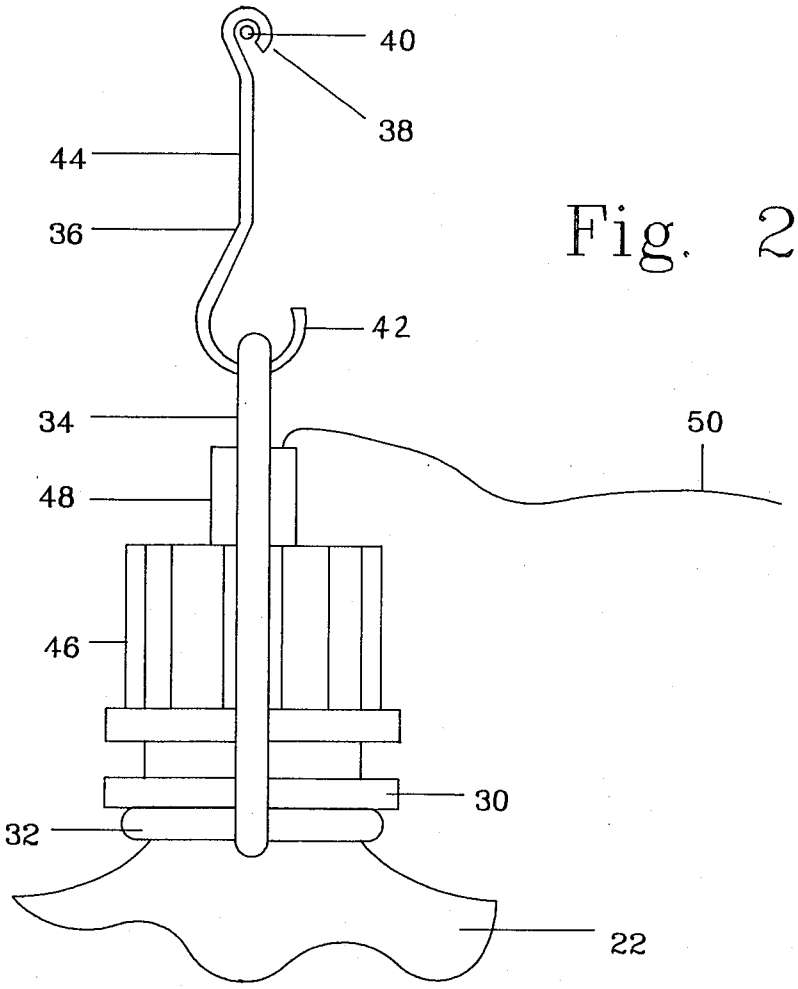
FIG. 2 is a close-up view of a portion of a fuel container of FIG. 1.

Referring now also to FIG. 2, container 22 includes a neck 30 having a suspension ring 32 affixed thereabout. A bail 34 is affixed to suspension ring 32 on opposite sides of neck 30 and extends upward forming a loop. A suspension hook 36 includes an upper loop 38 affixed to stand 24 by a bolt 40, an open hook 42 effective for engaging bail 34, and a shank 44 between upper loop 38 and open hook 42. As will be explained hereinafter, the length of shank 44 is critical for effective operation of fuel-air explosive unit 12.

A cap 46 is affixed to close neck 30 by conventional means such as, for example, threads (not shown) molded, or otherwise formed, on the outside of neck 30 and the inside of cap 46. A burster tube 48 extends through cap 46. A burster fuse wire 50 extends from burster tube 48 and is connected to a burster common bus 52 to which all other fuel-air explosive units are connected in parallel. Burster common bus 52 is connected to sequence timer 20.

Figure 3:
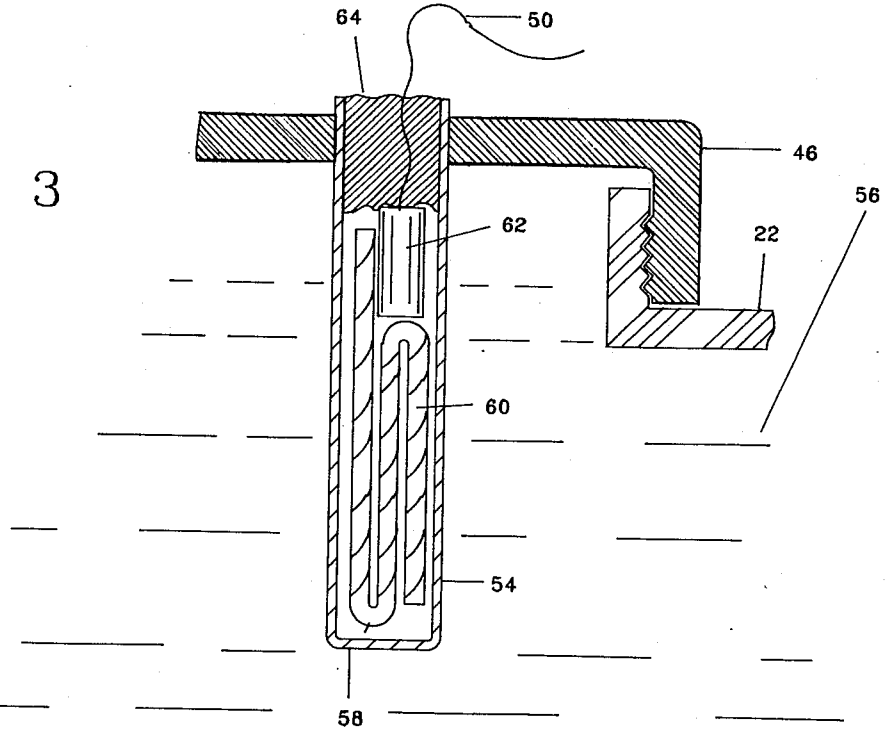
FIG. 3 is a cross section of a burster tube of the invention.

Referring now to FIG. 3, burster tube 48 includes a hollow cylinder 54 extending a substantial distance into a liquid explosive fuel 56. A closed end 58 of burster tube 48 prevents the entry of liquid explosive fuel 56 into hollow cylinder 54. A folded length of detonator cord 60 is disposed in hollow cylinder 54 with a conventional blasting cap 62 in contact therewith. Burster fuze wire 50 passes sealably through a sealing putty 64 closing the open end of hollow cylinder 54.

Returning now to FIG. 1, detonator unit 18 includes a stand 66 which may be of the same tripod type used for fuel-air explosive units 12, 14 and 16. A hook 68, or other suitable means, permits convenient attachment and detachment of a hook of a crane (not shown) from cleared ground. A suspension hook 70 within stand 66 supports a convenient type of detonator explosive 72 such as, for example, a mass of C4 explosive molded about a conventional blasting cap (not shown). The blasting cap may be of the same type illustrated in FIG. 3. A detonator wire 74 is connected from the blasting cap in detonator explosive 72 to a detonator common bus 76. Detonator common bus 76 is connected to sequence timer 20. Instead of suspending detonator explosive 72 within stand 66, it may be taped to one of the legs of stand 66.

In operation, sequence timer 20 first energizes burster common bus 52 which triggers simultaneous burster explosions in fuel-air explosive units 12, 14 and 16, as well as a possible additional number of fuel-air explosive units connected to burster common bus 52. Each fuel-air explosive unit produces an expanding droplet cloud forming an aerosol mixture with air. The radius of the cloud formed by each fuel-air explosive unit depends on the weight of the liquid fuel originally contained therein. We have discovered that the cloud horizontal radius at optimum development is approximately equal to:

$$R=5(W)^{\frac{1}{3}}$$

Where:

R = horizontal cloud radius in feet measured from a vertical center line of container 22

W = weight of fuel in pounds

Figure 4:
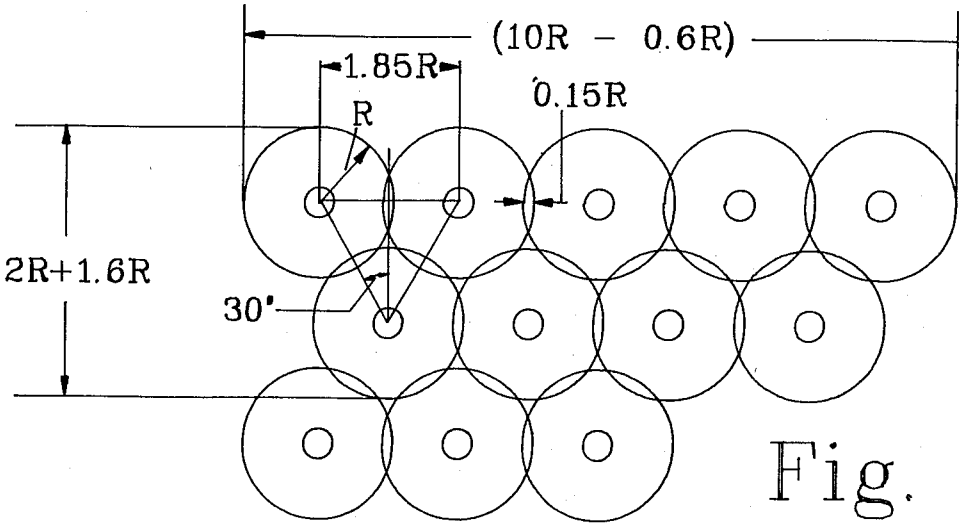
FIG. 4 is a plan view showing the dimensional relationships of wide-area mine clearance according to an embodiment of the invention.

A center-to-center spacing of adjacent fuel-air explosive units preferably provides a sufficient overlap of the clouds that detonation of the fuel-air mixture in one cloud propagates to its adjacent cloud. We have discovered that an overlap of about 15 percent of cloud horizontal radius is adequate to provide continuous explosive ignition along a line of contiguous clouds, whereby a single detonator explosive 72 is capable of detonating a complete line of clouds, formed by a line of fuel-air explosive units. Referring to FIG. 4, the above rule places the centers of adjacent fuel-air explosive units in a row spaced 1.85 R apart. In the specific case of a fuel weight of 64 pounds, a cloud radius of 20 feet is produced. An overlap of 15 percent requires placing adjacent fuel-air explosive units a distance of 37 feet apart.

The vertical distance from the ground to the center of container 22 is approximately $W^{\frac{1}{3}}$ for maximum impulse coupling to the ground. For a 9.3-gallon container 22, the center of container 22 is preferably located about 4 feet above the ground. Referring momentarily to FIG. 2, the height at which the center of container 22 is suspended can be adjusted by varying the length of shank 44 to accommodate containers 22 of different capacities.

Referring again to FIG. 1, detonator explosive 72 should be disposed at the same height above the ground as the center of container 22 and should be positioned within the cloud from fuel-air explosive unit 16 at a location wherein a suitable explosive fuel-air mixture exists. We have discovered that the fuel-air mixture at the center of a cloud is frequently too lean to produce dependable detonation. Thus, detonator explosive 72 should preferably not be located on fuel-air explosive unit 16. An optimum position for detonator explosive 72 appears to be about one-half the radius R of the cloud from the center of container 22. That is, when the radius of the cloud is 20 feet, detonator explosive 72 should be positioned about 10 feet horizontally from the center of container 22 in fuel-air explosive unit 16 and at the same height as the center of container 22.

At an optimum time following bursting of the fuel-air explosive units when the droplet clouds reaches an explosive mixture and overlap by about 15 percent, sequence timer 20 energizes detonator common bus 76 for detonating detonator explosive 72. The explosion of detonator explosive 72 detonates the explosive cloud formed by fuel-air explosive unit 16. Due to the cloud overlap, the detonation of the cloud formed by fuel-air explosive unit 16 propagates to the cloud formed by fuel-air explosive unit 14 and so forth along the line of overlapped clouds. A delay between the energization of burster common bus 52 and detonator common bus 76 is about 150 milliseconds.

Since stands 24 are located within their clouds, they experience very little translational force from the ensuing fuel-air explosion. As a consequence, stands 24 are generally re-usable with, at most, a small amount of refurbishing, and the cost of mine clearance is substantially reduced.

It will be clear to one skilled in the art that considerations of manpower efficiency and economics determines the sizes of containers 22, the resulting spacing therebetween and the number of fuel-air explosive units making up a line. We have discovered that substantially any number of contiguous clouds can be detonated by a single detonator unit 18. As a matter of insurance against unpredictable variations in cloud patterns breaking the detonation chain, we prefer to use at least two detonator units 18, one at each end of a line of fuel-air explosive units. The simultaneous propagation of explosions from the ends toward the center not only provides increased assurance of detonation of all clouds, but also enhances the explosive pulse at the center as the explosion waves converge thereon. In the preferred embodiment, from about 5 to about 15 fuel-air explosive units are employed forming a line and one detonator unit is positioned at each end of the line. In a further embodiment, a larger number of fuel-air explosive units are employed with at least one additional detonator unit 18 disposed along the line.

Referring again to FIG. 4, after a line of fuel-air explosive units are detonated, a second line is emplaced and detonated. The centers of the second line are preferably offset about a transverse distance R from centers of the first line. Thus, the distance between the centers of adjacent lines is about 1.6 R apart.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention.

What is claimed is:

1. A system for wide-area mine clearance comprising:

at least first and second fuel-air explosive units;

each of said at least first and second fuel-air explosive units including a stand, a container effective for containing a fuel, means for suspending said container a first predetermined height above a surface, and means for bursting said container and dispersing said fuel to form at least first and second clouds of fuel droplets in air, respectively;

each of said first and second clouds having a horizontal radius;

said at least first and second fuel-air explosive units being positioned a first horizontal distance apart less than twice said horizontal radius, whereby an explosion initiated in said first cloud from said first fuel-air explosive unit propagates to said second cloud from said second fuel-air explosive unit;

at least one detonator unit;

said at least one detonator unit containing a quantity of high explosive of a type effective for initiating a fuel-air explosion in one of said clouds;

said at least one detonator unit including means for disposing said quantity of high explosive at a second horizontal distance of less than said horizontal radius from a center of said first cloud and at a second predetermined height above said surface;

said second predetermined height being substantially equal to said first predetermined height;

means for explosively bursting said containers in said at least first and second fuel-air explosive units simultaneously, whereby said first and second clouds are formed; and means for detonating said quantity of high explosive a predetermined time after explosively bursting said containers, whereby a fuel-air explosion is produced in said first and second clouds.

2. A system for wide-area mine clearance according to claim 1 wherein said stand includes a tripod.

3. A system for wide-area mine clearance according to claim 2 wherein said tripod includes a suspension hook therein, said suspension hook cooperating with means on said container for suspending said container at said first predetermined height.

4. A system for wide-area mine clearance according to claim 1 wherein said stand includes means for permitting attachment and detachment of an external handling device, whereby said first and second fuel-air explosive units may be positioned on uncleared ground from a position within cleared ground.

5. A system for wide-area mine clearance according to claim 1 wherein said means for bursting includes a pattern of scored lines on said container for achieving a uniform burst pattern.

6. A system for wide-area mine clearance according to claim 1 wherein said means for bursting includes a burster tube extending into said container, said burster tube including a blasting cap and an explosive in contact therewith.

7. A system for wide-area mine clearance according to claim 6 wherein said explosive is a length of detonator cord.

8. A system for wide-area mine clearance according to claim 1 wherein said first predetermined horizontal distance is substantially equal to 1.85 times said radius.

9. A system for wide-area mine clearance according to claim 1 wherein said first predetermined horizontal distance is related to a weight of said fuel.

10. A system for wide-area mine clearance according to claim 9 wherein the relationship is a one-third power relationship.

11. A system for wide-area mine clearance according to claim 1 wherein said second horizontal distance is substantially equal to half of said radius.

12. A system for wide-area mine clearance according to claim 1 wherein said first predetermined height is related to a weight of said fuel.

13. A system for wide-area mine clearance according to claim 12 wherein the relationship is a one-third power relationship.

14. A method for wide-area mine clearance comprising:

positioning at least first and second fuel-air explosive units a first predetermined horizontal distance apart;

suspending a first fuel container in said first fuel-air explosive unit and a second fuel container in said second fuel-air explosive unit a first predetermined height above a surface;

explosively bursting said first and second fuel containers and dispersing said fuel to form first and second clouds of fuel droplets in air, respectively;

each of said first and second clouds having a horizontal radius;

said first predetermined horizontal distance apart being less than twice said radius, whereby an explosion initiated in said first cloud from said first fuel-air explosive unit propagates to said second cloud from said second fuel-air explosive unit;

positioning at least one detonator unit containing a quantity of high explosive of a type effective for initiating a fuel-air explosion in one of said first and second clouds at a second predetermined horizontal distance from said first fuel-air explosive unit and at said first predetermined height above said surface;

said second horizontal distance being less than said horizontal radius;

explosively bursting said first and second fuel containers simultaneously, whereby said first and second clouds are formed; and detonating said quantity of high explosive a predetermined time after explosively bursting said first and second fuel containers, whereby a fuel-air explosion is produced propagating from said first cloud to said second cloud.

* * * * *